US007395300B2

(12) United States Patent
Koshy et al.

(10) Patent No.: US 7,395,300 B2
(45) Date of Patent: Jul. 1, 2008

(54) SYSTEM, AND METHOD FOR CALCULATING PRODUCT OF CONSTANT AND MIXED NUMBER POWER OF TWO

(75) Inventors: Sunoj Koshy, Bangalore (IN); Arun Rao, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 883 days.

(21) Appl. No.: 10/765,614

(22) Filed: Jan. 27, 2004

(65) Prior Publication Data

US 2005/0165877 A1 Jul. 28, 2005

(51) Int. Cl.
*G06F 7/52* (2006.01)

(52) U.S. Cl. .................................................... 708/620

(58) Field of Classification Search .......... 708/620–632
See application file for complete search history.

(56) References Cited

U.S. PATENT DOCUMENTS 4,899,302 A * 2/1990 Nakayama .................. 708/440
5,703,802 A * 12/1997 Tsubata et al. .............. 708/628
5,764,990 A * 6/1998 Sullivan ..................... 708/550
5,841,684 A * 11/1998 Dockser ..................... 708/625
6,223,197 B1 * 4/2001 Kosugi ....................... 708/620
6,345,285 B1 * 2/2002 Nagao et al. ................ 708/517

* cited by examiner

*Primary Examiner*—Tan V Mai
(74) *Attorney, Agent, or Firm*—McAndrews, Held & Malloy, Ltd.

(57) ABSTRACT

Presented herein are systems and methods for computing the product of a constant and a mixed number power of two. A circuit comprises a first register, a second register, a memory, a third register, and a multiplier circuit. The first register stores the constant. The second register stores the integer portion and the fraction portion. The memory stores a plurality of values, each of said plurality of values corresponding to a particular one of a corresponding plurality of fractions, wherein each one of said plurality of values is two to the exponential fraction corresponding to the one of said plurality of values. The third register stores a particular one of the plurality of values, said particular one of the plurality of values corresponding to the fraction portion. The multiplier circuit multiplies the contents of the third register by the contents of the first register, thereby resulting in a product. The product is shifted a certain number of times, the certain number of times equal to the integer portion.

17 Claims, 5 Drawing Sheets

SYSTEM, AND METHOD FOR CALCULATING PRODUCT OF CONSTANT AND MIXED NUMBER POWER OF TWO

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

An MPEG audio decoder decodes compressed audio data by performing a number of different functions and computations. Among the functions and computations is resealing of frequency coefficients. The resealing of frequency coefficients comprises the multiplication of constants, C, by a power of 2, $2^X$, where X comprises the sum of an integer and a fraction.

Computation of $2^f$ in hardware is complex where f is a non-integer. Although the computation of $2^f$ is less complex in software, speed considerations involved in decompressing audio data in real time makes a software solution less desirable.

Further limitations and disadvantages of conventional and traditional approaches will become apparent to one of skill in the art through comparison of such systems with embodiments presented in the remainder of the present application with reference to the drawings.

BRIEF SUMMARY OF THE INVENTION

Presented herein are systems and methods for computing the product of a constant and a mixed number power of two.

In one embodiment, there is a circuit for computing a product of a constant and a mixed number power of two. The mixed number comprises an integer portion and a fraction portion. The circuit comprises a first register, a second register, a memory, a third register, and a multiplier circuit. The first register stores the constant. The second register stores the integer portion and the fraction portion. The memory stores a plurality of values, each of said plurality of values corresponding to a particular one of a corresponding plurality of fractions, wherein each one of said plurality of values is two to the exponential fraction corresponding to the one of said plurality of values. The third register stores a particular one of the plurality of values, said particular one of the plurality of values corresponding to the fraction portion. The multiplier circuit multiplies the contents of the third register by the contents of the first register, thereby resulting in a product. The product is shifted a certain number of times, the certain number of times equal to the integer portion.

In another embodiment, there is presented a method for computing a product of a constant and mixed number power of two. The mixed number comprises an integer portion and a fraction portion. The method comprises receiving the constant; receiving the integer portion; receiving the fraction portion; providing the fraction portion to a memory storing a plurality of values, each of said plurality of values corresponding to a particular one of a corresponding plurality of fractions, wherein each one of said plurality of values is two to the exponential fraction corresponding to the one of said plurality of values; receiving a particular one of the plurality of values, said particular one of the plurality of values corresponding to the fraction portion; multiplying the constant by the particular one of the plurality of values, thereby resulting in a product; and shifting the product a certain number of times, the certain number of times equal to the integer portion.

In another embodiment, there is presented a audio decoder for decoding compressed audio data. The audio decoder comprises a Huffman decoder, inverse quantizer and a resampler. The Huffman decoder decodes quantized coefficients. The inverse quantizer inverse quantizes the quantized coefficients. The rescaler multiplies the unscaled inversely quantized coefficients with relevant scale factors. The rescaler comprises a first register, a second register, a memory, a third register, and a multiplier circuit. The first register stores the constant. The second register stores the integer portion and the fraction portion. The memory stores a plurality of values, each of said plurality of values corresponding to a particular one of a corresponding plurality of fractions, wherein each one of said plurality of values is two to the exponential fraction corresponding to the one of said plurality of values. The third register stores a particular one of the plurality of values, said particular one of the plurality of values corresponding to the fraction portion. The multiplier circuit multiplies the contents of the third register by the contents of the first register, thereby resulting in a product. The product is shifted a certain number of times, the certain number of times equal to the integer portion.

These and other advantages and novel features of the present invention, as well as details of an illustrated embodiment thereof, will be more fully understood from the following description and drawings.

DETAILED DESCRIPTION OF THE INVENTION

Figure 1:
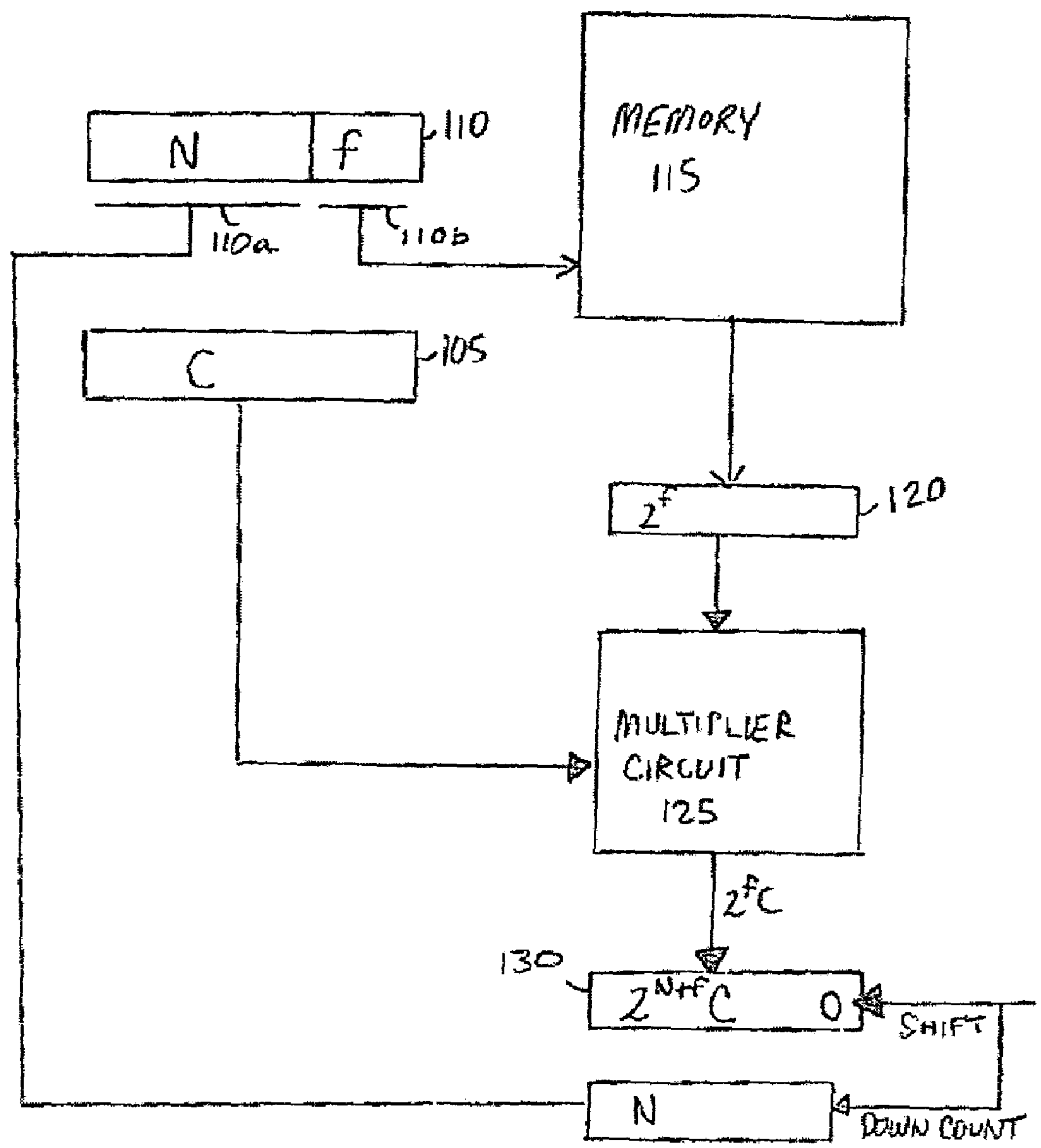
FIG. 1 is a block diagram describing an exemplary circuit for calculating the product of a coefficient and a mixed number power of two, in accordance with an embodiment of the present invention.

Referring now to FIG. 1, there is illustrated a block diagram of a circuit for calculating the product of a coefficient, C, and a mixed number X power of two. The coefficient can comprise any number, both an integer, or mixed number, and can be positive or negative. The mixed number X is the sum of an integer portion N, and a fraction portion f.

The coefficient C is received in a coefficient register 105 and the integer portion N and fraction portion f are received in an exponent register 110. The exponent register 110 comprises a first set of bits 110*a* for the integer portion N, and a second set of bits 110*b* for the fraction portion f.

The value $2^X C$ is equal to $2^N (2^f C)$. Accordingly, the product can be calculated by first multiplying the coefficient by the fraction power of two, and then multiplying the product by the integer power of two. Computation of $2^f$ in hardware is complex where f is a non-integer. Although the computation of $2^f$ is less complex in software, speed considerations may make a software solution less desirable. Instead, the value of $2^f$, for a number of values of f, can be pre-calculated and stored in a memory 115.

As noted above, the second set of bits 110*b* store the fraction portion f. The memory 115 can store the value $2^f$ for each f that can be represented by the second set if bits 110*b*. For example, where the second set of bits comprises two bits, the two bits can represent, in decimal, f=0, f=¼, f=½, and f=¾. Accordingly, the memory 115 can store the values for $2^0$ (1.0000), $2^{1/4}$ (1.1892), $2^{1/2}$, (1.4142) and $2^{3/4}$ (1.6818).

The memory 115 receives the fraction portion f from the second set of bits 110*b* of the exponent register 110. Upon receiving the second set of bits 110*b*, the memory 115 outputs the value for $2^f$ into another register 120.

The register 120 provides the value for $2^f$ to a multiplier circuit 125. The multiplier circuit 125 also receives the constant C from the constant register 105. The multiplier circuit 125 comprises a hardware circuit for multiplying operands, and can include, but is not limited to, an arithmetic logic unit. The multiplier circuit 125 multiplies the constant C from the constant register 105 and the value of $2^f$ from register 120, and writes the product $2^f C$ into a shift register 130.

As noted above, $2^X C$ is equal to $2^N (2^f C)$. The product of $2^N$ and $2^f C$ is computer from $2^f C$ by shifting in zeroes from the right side, N times. As the shift register 130 shifts in zeros from the right, the first set of bits 110*a* are decremented after each shift. When the first set of bits 110*a* equal zero, the shift register 130 stores $2^X C$.

Figure 2:
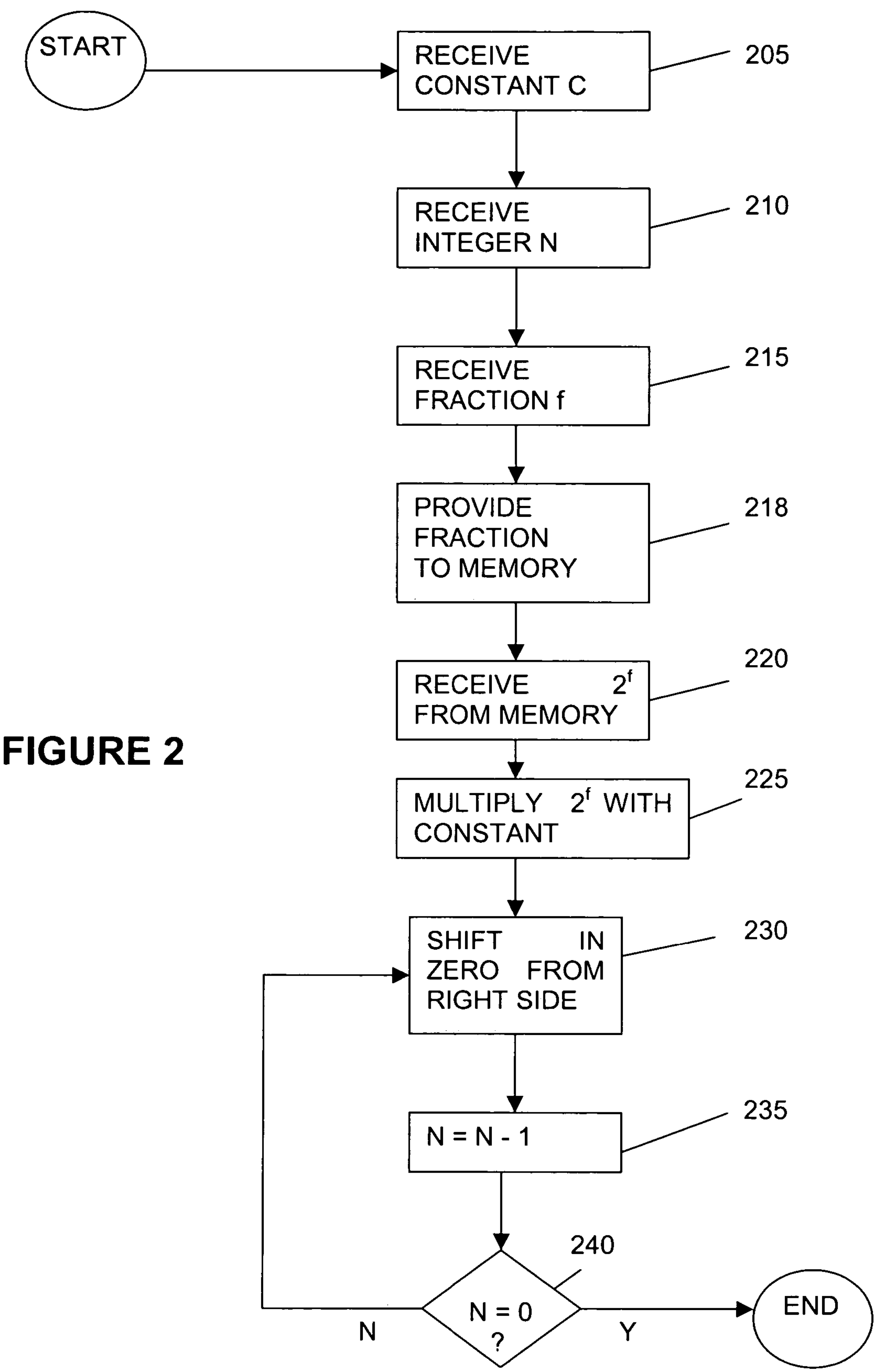
FIG. 2 is a flow diagram for calculating the product of a coefficient and a mixed number power of two, in accordance with an embodiment of the present invention.

Referring now to FIG. 2, there is illustrated a flow diagram for computing $2^X C$, where X equals a mixed number that is the sum of an integer N, and a fraction f. The coefficient C is received at 205, the integer portion N is received at 210, and fraction portion f is received at 215.

The fraction portion f is provided to memory 115 at 218. Upon receiving the fraction portion f, the memory 115 provides (220) the value for $2^f$. At 225, the constant C from the constant register 105 and the value of $2^f$ are multiplied, resulting in a product $2^f C$.

The product of $2^N$ and $2^f C$ is computed from $2^f C$ by shifting in zeroes to the right side, N times. At 230, a zero is shifted in from the right side to the product $2^f C$. At 235, the integer portion N is decremented. At 240, a determination is made whether N=0. If at 240, N does not equal 0, 230 and 235 are repeated. If at 240, N=0, then the product $2^f C$ with the zeroes shifted in from the right side equals $2^X C$.

The present invention can be used for the calculation of a variety of non-linear functions in a variety of applications. For example, in MPEG-2 AAC decoders and MPEG-1 Layer-3 Decoders, spectral values are Huffman coded. In the decoder, the spectral values are Huffman decoded and need to be multiplied by $2^X$ (where X is a mixed number comprising the sum of an integer N, and a fraction f) in the inverse quantization block.

Figure 3:
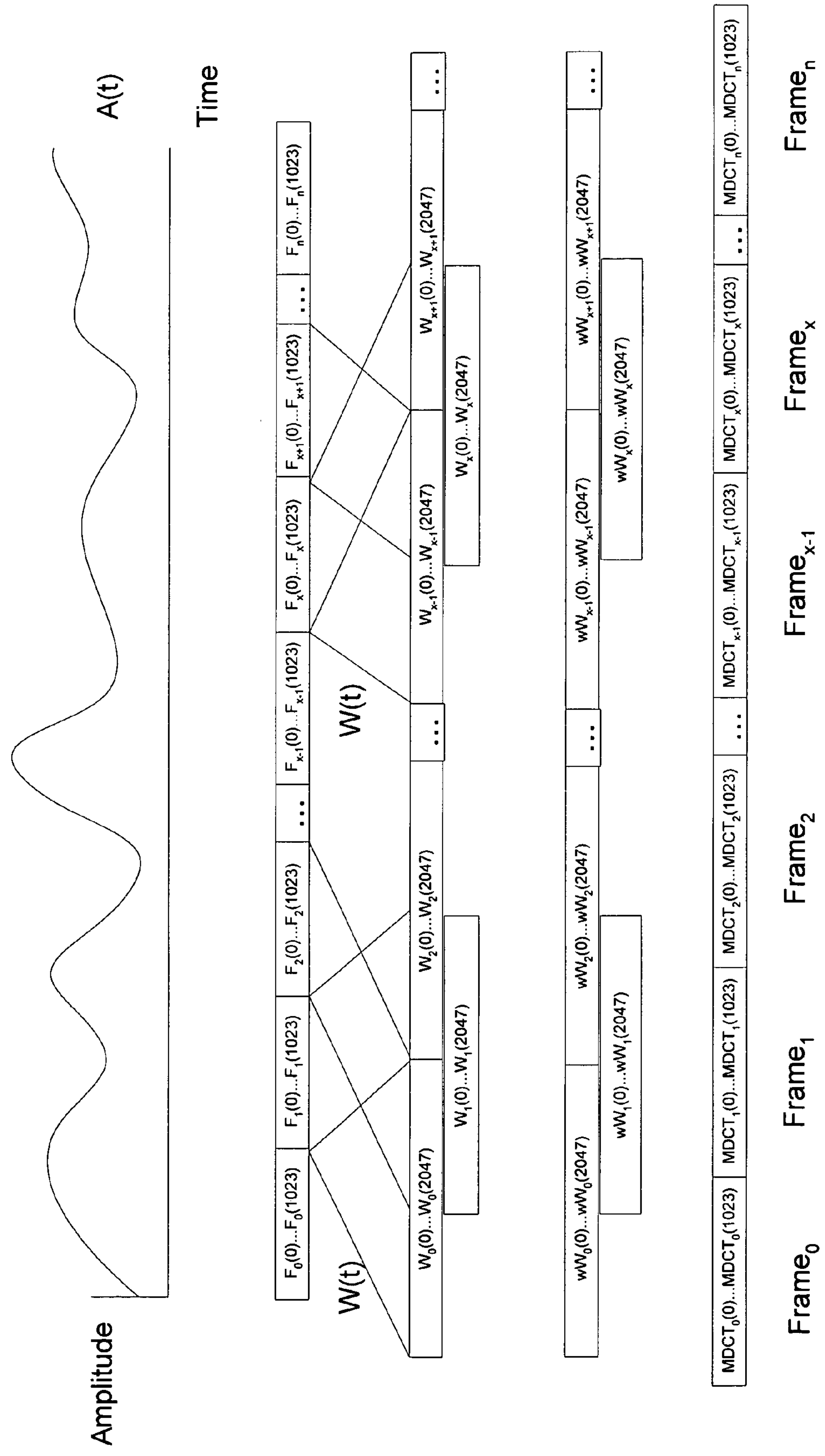
FIG. 3 is a block diagram describing the compression of an audio signal.

Referring now to FIG. 3, there is illustrated a block diagram describing the encoding of an exemplary audio signal A(t). Pursuant to the MPEG-2 Advanced Audio Coding (MPEG-2 AAC) standard, the audio signal is sampled at rates starting at 8K samples/sec to 96K samples/sec. The samples are grouped into frames $F_0 \ldots F_n$ of 1024 samples, e.g., $F_x(0) \ldots F_x(1023)$. The frames $F_0 \ldots F_n$ are grouped into windows $W_0 \ldots W_n$ that comprise 2048 samples, e.g., $W_x(0) \ldots W_x(2047)$. However, each window $W_x$ has a 50% overlap with the previous window $W_{x=l}$. Accordingly, the first 1024 samples of a window $W_x$ are the same as the last 1024 samples of the previous window $W_{x-1}$. A window function w(t) is applied to each window $W_0 \ldots W_{n-1}$, resulting in sets $wW_0 \ldots wW_n$, of 2048 windowed samples, e.g., $wW_x(0) \ldots wW_x(2047)$. The modified discrete cosine transformation (MDCT) is applied to each set $wW_0 \ldots wW_n$ of windowed samples $wW_x(0) \ldots wW_x(2047)$, resulting sets $MDCT_0 \ldots MDCT_n$ of 1024 frequency coefficients, e.g., $MDCT_x(0) \ldots MDCT_x(1023)$.

Figure 4:
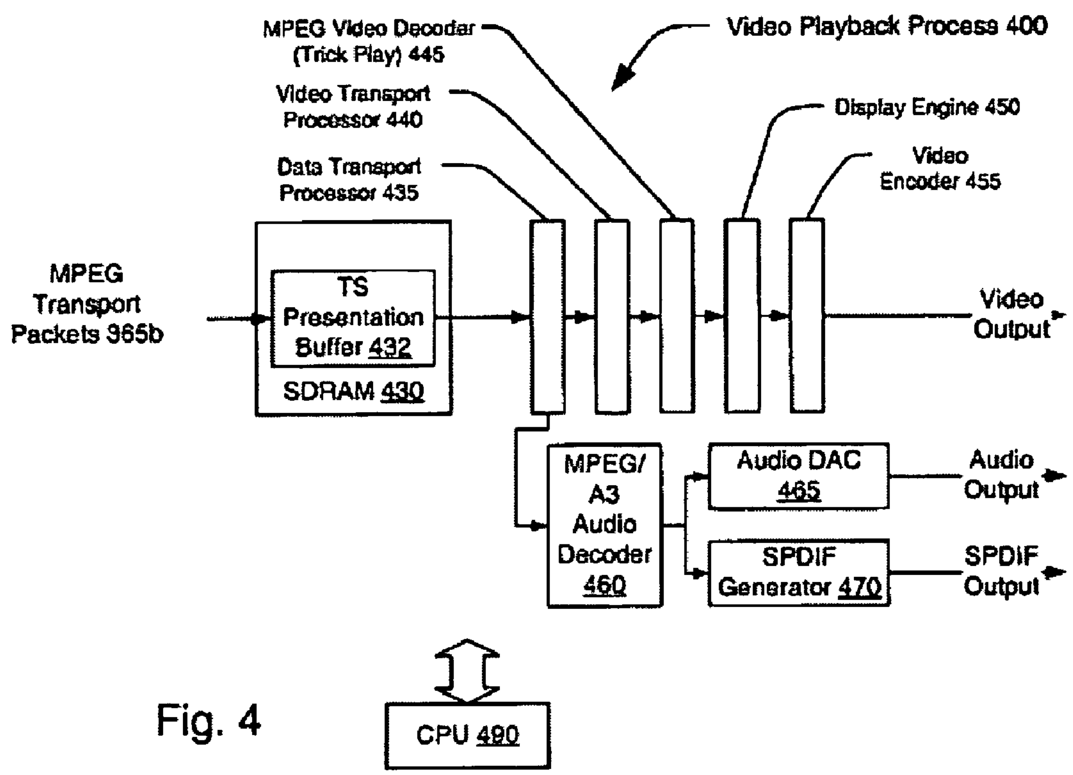
FIG. 4 is a block diagram of an exemplary decoder system in accordance with an embodiment of the present invention.

The sets of frequency coefficients $MDCT_0 \ldots MDCT_n$ are then quantized and coded for transmission, forming what is known as an audio elementary stream AES. The AES is then placed in fixed size transport packets, forming what is known as the audio transport stream (TS). The audio TS can be multiplexed with other audio TS and video TS. The multiplexed signal can then be stored, and/or transported For playback on a playback device. The playback device can either be local or remotely located. Where the playback device is remotely located, the multiplexed signal is transported over a communication medium, such as the internet. During playback, the Audio TSs are demultiplexed, resulting in the constituent AES signals. The constituent AES signals are then decoded, resulting in the audio signal. Referring now to FIG. 4, there is illustrated a block diagram of an exemplary decoder for decoding compressed video data, configured in accordance with an embodiment of the present invention. A processor, that may include a CPU 490, reads a stream of transport packets 365*b* (a transport stream) into a transport stream buffer 432 within an SDRAM 430. The data is output from the transport stream presentation buffer 432 and is then passed to a data transport processor 435. The data transport processor then demultiplexes the MPEG transport stream into its PES constituents and passes the audio transport stream to an audio decoder 460 and the video transport stream to a video transport processor 440. The audio data is sent to the output blocks and the video is sent to a video decoder 445 and display engine 450.

Figure 5:
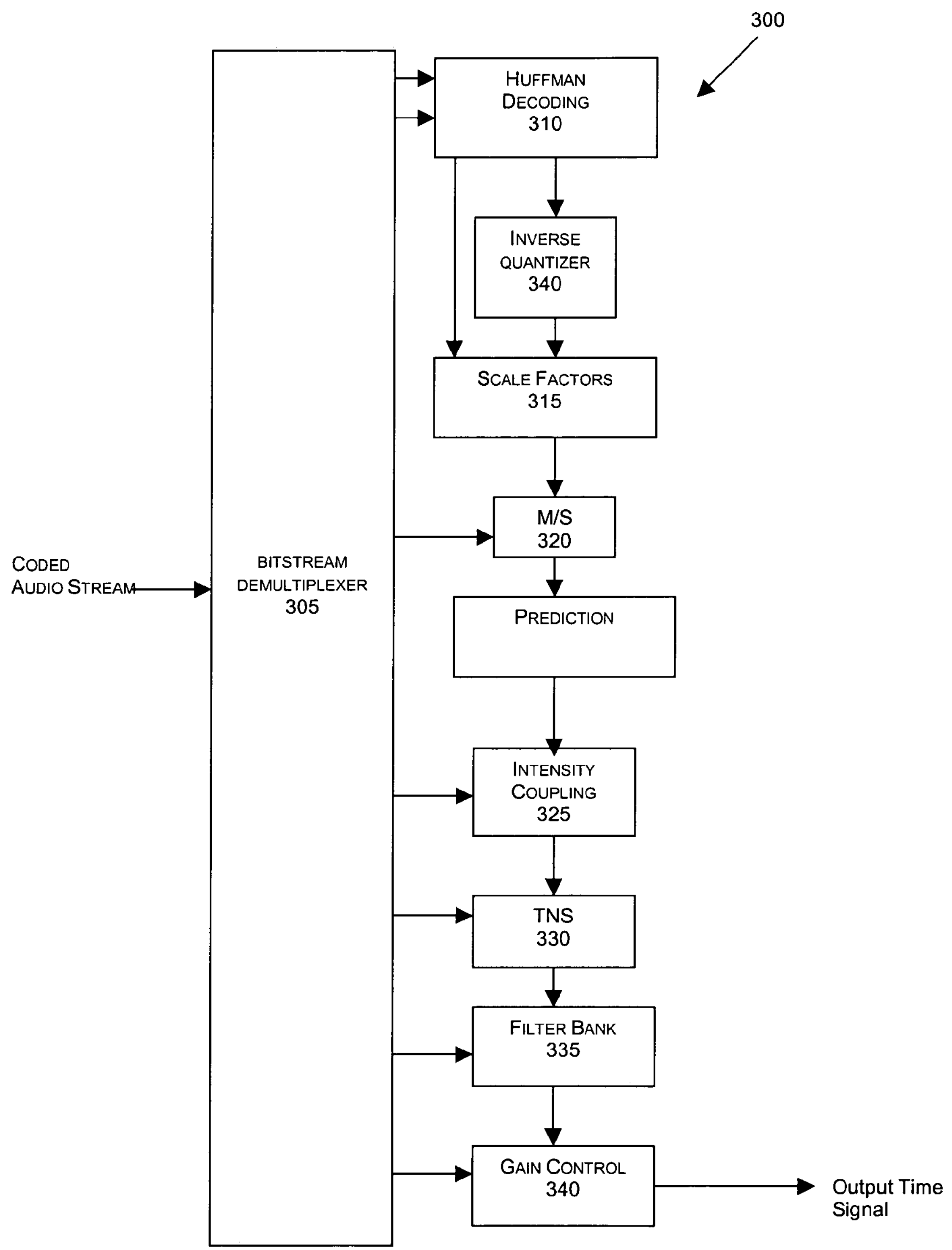
FIG. 5 is a block diagram of an audio decoder in accordance with an embodiment of the present invention; This figure is not relevant.

Referring now to FIG. 5, there is illustrated a block diagram describing an exemplary audio decoder 460 in accordance with an embodiment of the present invention. Once the frame synchronization is found, the AAC bitstream is demultiplexed by a bitstream demultiplexer 305. The bitstream demultiplexer separates the parts of the MPEG-2AAC data stream into the parts for each tool, and provides each of the tools with the bitstream information related to that tool. The AAC decoder includes Huffman decoding 310, a rescaler 315, and the decoding of the side information used in tools such as mono/stereo 320, intensity stereo 325, TNS 330, and the filter bank 335. The sets of frequency coefficients $MDCT_0 \ldots MDCT_N$ are decoded and copied to the output buffer in a sample fashion. After Huffman decoding 310, an inverse quantizer 340 inverse quantizes each set of frequency coefficients $MDCT_0 \ldots MDCT_n$ by a 4/3 power nonlinearity. The rescaler 315 multiplies un-scaled inversely quantized frequency coefficients $MDCT_0 \ldots MDCT_n$ with scale factors.

Additionally, tools including the mono/stereo 320, intensity stereo 325, TNS 330, and can apply further functions to the sets of frequency coefficients $MDCT_0 \ldots MDCT_N$. Finally, the filter bank 335 transforms the frequency coefficients $MDCT_0 \ldots MDCT_n$ into the time domain signal A(t). The filter bank 335 transforms the frequency coefficients by application of the Inverse MDCT (IMDCT), the inverse window function, window overlap, and window adding.

The rescaler 315 multiplies the non-zero values by $2^X$, where X comprises the sum of an integer N, and a fraction f.

The rescaler 315 can comprise the circuit of FIG. 1 for multiplying the non-zero values by $2^X$. Alternatively, the rescaler 315 can multiply the non-zero values by $2^X$ by effectuating the flow diagram described in FIG. 2.

The decoder system as described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein various operations are implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A circuit for computing a product of a constant and a mixed number power of two, said mixed number comprising an integer portion and a fraction portion, said circuit comprising:

a first register for storing the constant;

a second register for storing the integer portion and the fraction portion;

a memory for storing a plurality of values, each of said plurality of values corresponding to a particular one of a corresponding plurality of fractions, wherein each one of said plurality of values is two to the exponential fraction corresponding to the one of said plurality of values;

a third register for storing a particular one of the plurality of values, said particular one of the plurality of values corresponding to the fraction portion;

a multiplier circuit for multiplying the contents of the third register by the contents of the first register, thereby resulting in a product; and the product being shifted a certain number of times, the certain number of times equal to the integer portion.

2. The circuit of claim 1, wherein the second register comprises:

a first one or more bits for storing the integer portion; and a second one or more bits for storing the fraction portion.

3. The circuit of claim 2, further comprising:

a shift register for storing the product and shifting the product the certain number of times.

4. The circuit of claim 3, wherein the first one or more bits are decremented after each shift of the shift register.

5. The circuit of claim 4, wherein the shift register shifts until the first one or more bits are decremented to zero.

6. The circuit of claim 1, wherein the plurality of values comprises at least four values.

7. A method for computing a product of a constant and a mixed number power of two, said mixed number comprising an integer portion and a fraction portion, said method comprising:

receiving the constant;

receiving the integer portion receiving the fraction portion;

providing the fraction portion to a memory storing a plurality of values, each of said plurality of values corresponding to a particular one of a corresponding plurality of fractions, each one of said plurality of values being two to the exponential fraction corresponding to the one of said plurality of values;

receiving a particular one of the plurality of values, said particular one of the plurality of values corresponding to the fraction portion;

multiplying the constant by the particular one of the plurality of values, thereby resulting in a product; and shifting the product a certain number of times, the certain number of times equal to the integer portion; and decompressing audio data, based on the shifted product.

8. The method of claim 7, further comprising:

decrementing the constant after shifting the product.

9. The method of claim 8, further comprising shifting until the constant is decremented to zero.

10. The method of claim 7, wherein the plurality of values comprises at least four values.

11. The method of claim 7, further comprising:

transmitting decompressed audio data to a speaker.

12. A video decoder for decoding compressed video data, said video decoder comprising:

a Huffman decoder for decoding quantized coefficients;

an inverse quantizer for inverse quantizing the quantized coefficients, thereby resulting in inverse quantized coefficients; and a rescaler for scaling the inverse quantized coefficients, said rescaler further comprising:

a first register for storing a constant;

a second register for storing an integer portion and a fraction portion;

a memory for storing a plurality of values, each of said plurality of values corresponding to a particular one of a corresponding plurality of fractions, each one of said plurality of values being two to the exponential fraction corresponding to the one of said plurality of values;

a third register for storing a particular one of the plurality of values, said particular one of the plurality of values corresponding to the fraction portion;

a multiplier circuit for multiplying the contents of the third register by the contents of the first register, thereby resulting in a product; and the product being shifted a certain number of times, the certain number of times equal to the integer portion.

13. The video decoder of claim 12, wherein the second register comprises:

a first one or more bits for storing the integer portion; and a second one or more bits for storing the fraction portion.

14. The video decoder of claim 13, wherein the inverse quantizer further comprises:

a shift register for storing the product and shifting the product the certain number of times.

15. The video decoder of claim 14, wherein the first one or more bits are decremented after each shift of the shift register.

16. The video decoder of claim 15, wherein the shift register shifts until the first one or more bits are decremented to zero.

17. The video decoder of claim 12, wherein the plurality of values comprises at least four values.

* * * * *